United States Patent
Koshiba

(10) Patent No.: US 7,409,341 B2
(45) Date of Patent: Aug. 5, 2008

(54) SPEECH RECOGNIZING APPARATUS WITH NOISE MODEL ADAPTING PROCESSING UNIT, SPEECH RECOGNIZING METHOD AND COMPUTER-READABLE MEDIUM

(75) Inventor: Ryosuke Koshiba, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/760,909

(22) Filed: Jun. 11, 2007

(65) Prior Publication Data

US 2007/0233480 A1 Oct. 4, 2007

Related U.S. Application Data

(63) Continuation of application No. 10/329,553, filed on Dec. 27, 2002, now Pat. No. 7,260,527.

(30) Foreign Application Priority Data

Dec. 28, 2001 (JP) ............................. 2001-401615

(51) Int. Cl.
*G10L 21/02* (2006.01)
*G10L 15/04* (2006.01)

(52) U.S. Cl. ...................... 704/233; 704/254

(58) Field of Classification Search ........................ None
See application file for complete search history.

(56) References Cited

U.S. PATENT DOCUMENTS

| | | | |
|---|---|---|---|
| 4,630,304 A | 12/1986 | Borth et al. | |
| 4,715,065 A | 12/1987 | Parker | |
| 4,720,802 A | 1/1988 | Damoulakis et al. | |
| 4,912,767 A | 3/1990 | Chang | |
| 5,134,658 A | 7/1992 | Chen et al. | |
| 5,459,814 A | 10/1995 | Gupta et al. | |
| 5,649,055 A | 7/1997 | Gupta et al. | |
| 5,689,615 A | 11/1997 | Benyassine et al. | |
| 5,708,754 A | 1/1998 | Wynn | |
| 5,757,937 A | 5/1998 | Itoh et al. | |
| 5,924,067 A * | 7/1999 | Kosaka et al. ............ | 704/256.5 |
| 7,260,527 B2 * | 8/2007 | Koshiba ..................... | 704/233 |
| 2005/0027527 A1 * | 2/2005 | Junkawitsch et al. ........ | 704/243 |

* cited by examiner

*Primary Examiner*—David D Knepper
(74) *Attorney, Agent, or Firm*—Oblon, Spivak, McClelland, Maier & Neustadt, P.C.

(57) ABSTRACT

A recognizing target vocabulary comparing unit calculates a compared likelihood of recognizing target vocabulary, i.e., a compared likelihood of registered vocabulary, by using the time series of the amount of characteristics of an input speech. An environment adapted noise model comparing unit compares the time series of the amount of characteristics with one recognizing standard pattern or with two or more combined recognizing standard patterns one-by-one to obtain a likelihood that respective environment adaptive noise models coincide with the time series of the amount of characteristics. A rejection determining unit determines whether or not the input signal is noise by comparing the likelihood obtained by the recognizing target vocabulary comparing step with the likelihood obtained by the environment adaptive noise model comparing step. A noise model adapting unit calculates a first likelihood by comparing the time series of the amount of characteristics with recognizing standard patterns and orders the recognizing standard patterns in accordance with the size of the first likelihood. Thus, the environment adaptive noise model matches to a real environment and the rejection determination can be performed for a noise input with high accuracy.

27 Claims, 8 Drawing Sheets

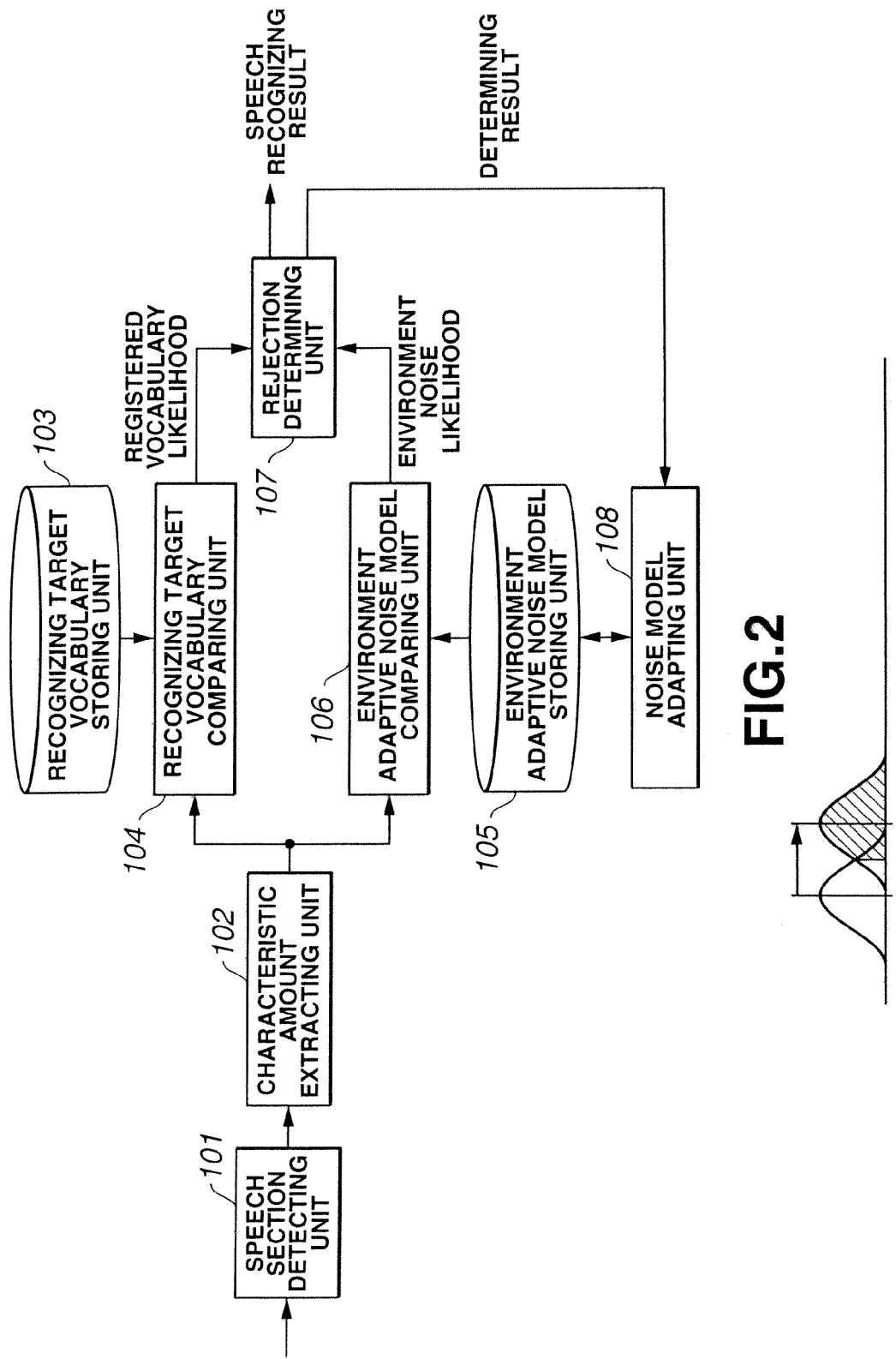

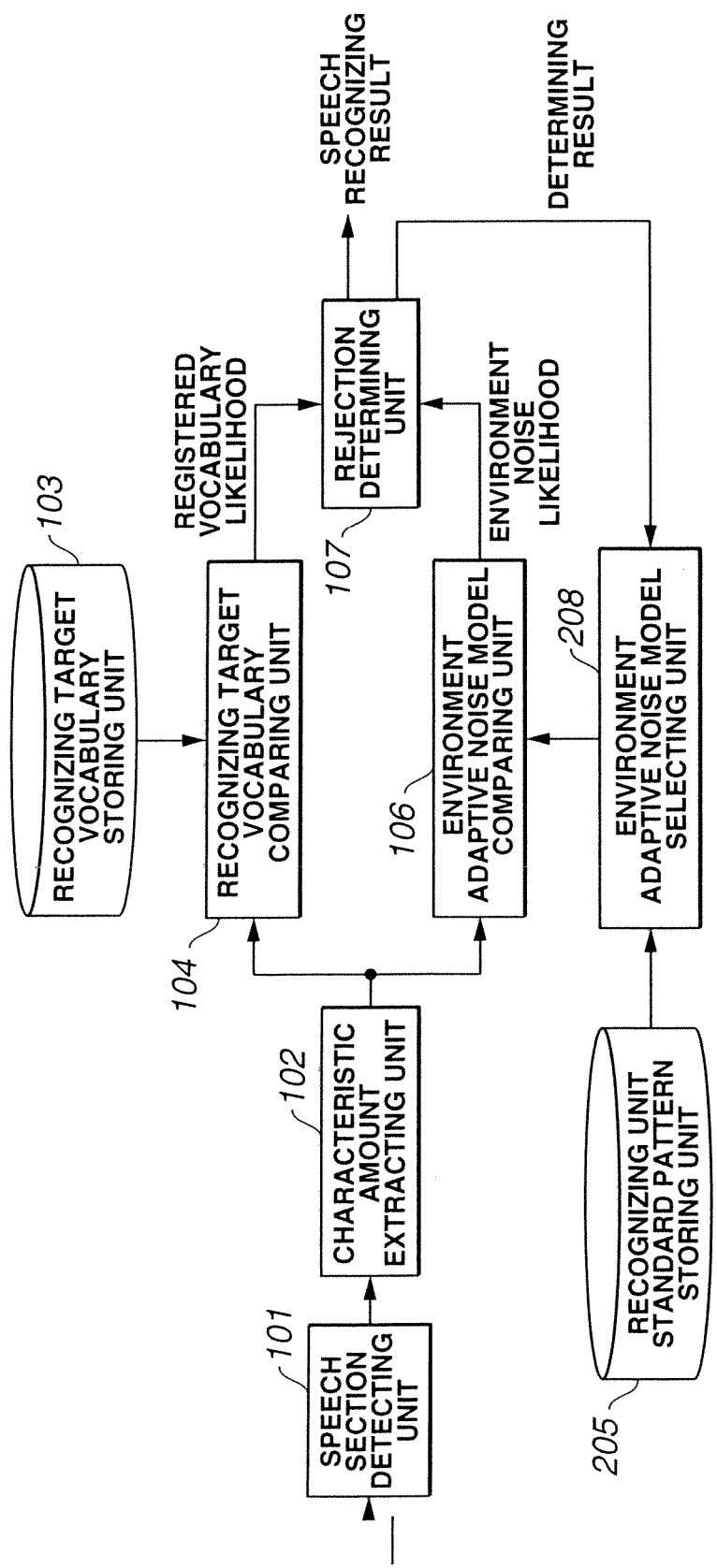

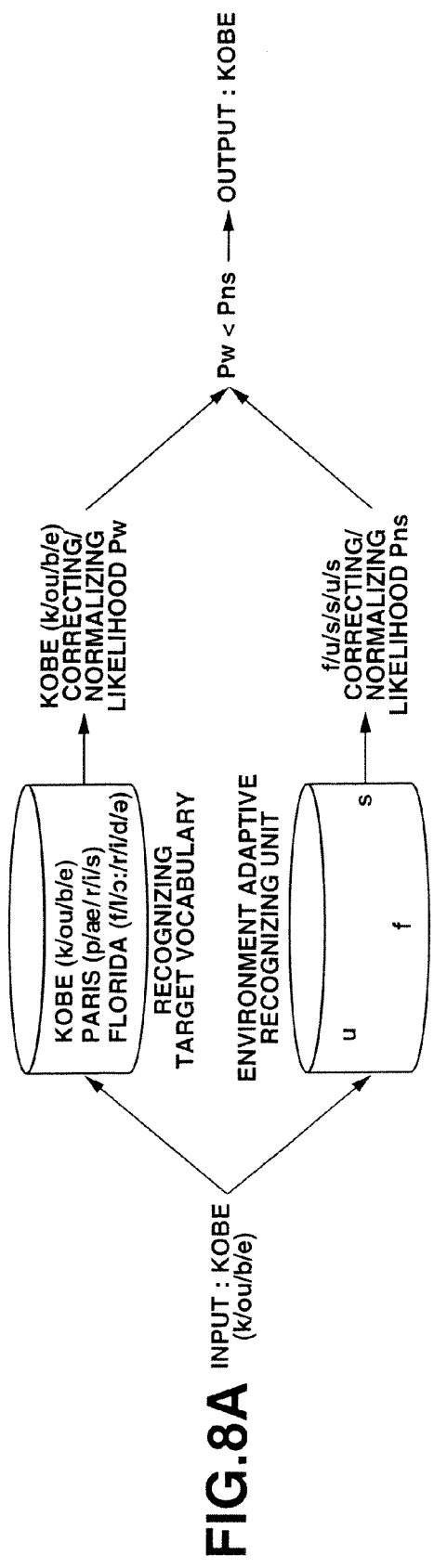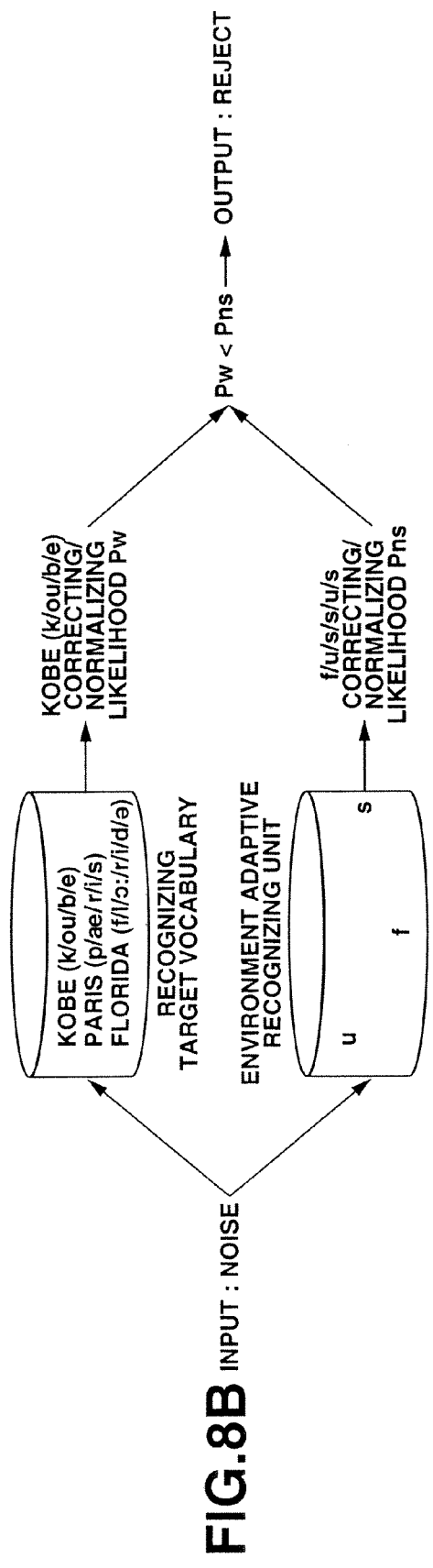

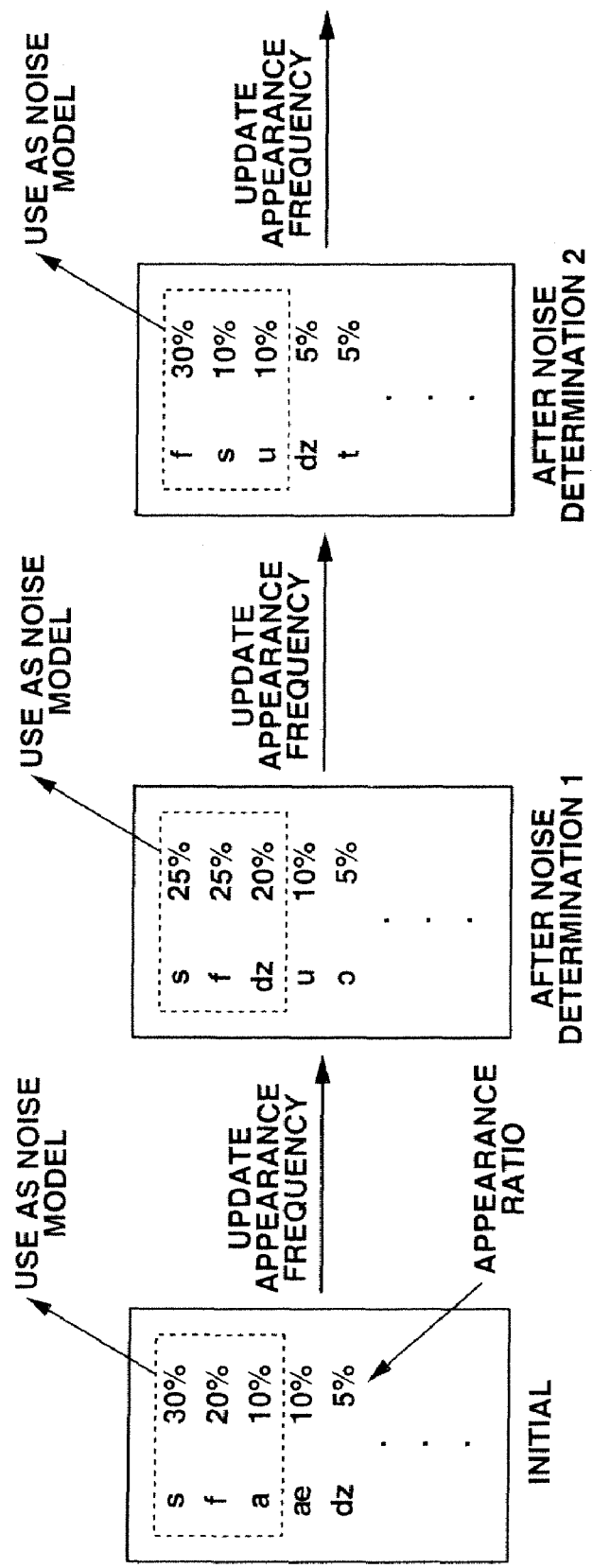

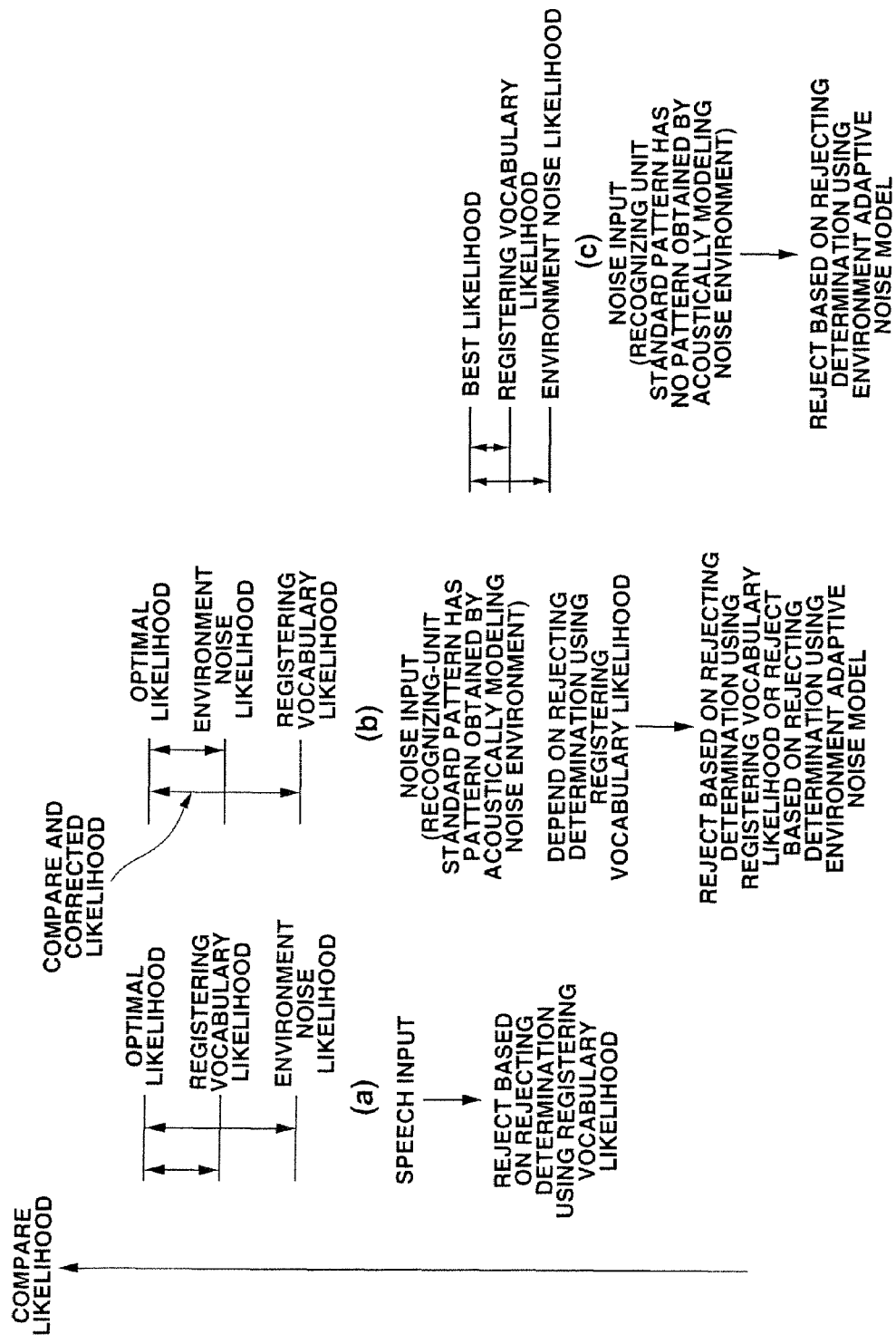

SPEECH RECOGNIZING APPARATUS WITH NOISE MODEL ADAPTING PROCESSING UNIT, SPEECH RECOGNIZING METHOD AND COMPUTER-READABLE MEDIUM

This application is a Continuation of application Ser. No. 10/329,553, filed Dec. 27, 2002 and claims the benefit of priority from the prior Japanese Application No. 2001 401615, filed Dec. 28, 2001. The entire contents of these applications are incorporated herein by reference.

BACKGROUND OF INVENTION

1. Field of the Invention

The present invention relates to a speech recognizing apparatus, a speech recognizing method, and a speech recognizing program which are preferable to reject environmental noises other than a recognizing target vocabulary.

2. Description of the Related Art

Recently, the improvement in performance of a speech recognizing technology causes the widely practical use of speech recognizing engine under a real environment. In particular, the case of limiting input devices in a car navigation system or a mobile device and the like increasingly requires the speech recognition. Under the above mentioned environment, a hand free function is raised as one of the functions strongly desired for the speech recognition, in order to continuously capture the speech and shift to predetermined processing only in the occasion when a previously registered vocabulary is inputted.

For example, in the car navigation system, various environmental noises such as noises generated by running, klaxon, and noises generated by another-vehicle running are inputted to the speech recognizing engine during continuously capturing the speech under the real environment. Thus, the speech recognizing engine requires a function for correctly recognizing the user's speech and rejecting non-speech such as the various environment noises.

The conventional speech recognizing apparatus compares a recognizing target vocabulary formed based on a phoneme model with the amount of characteristics extracted from an input speech, and outputs the highest value of the comparison result that respective recognizing target vocabularies coincide with the time series of the amount of characteristics (hereinafter, referred to as a likelihood) as a result of recognizing the speech. A likelihood of the input of environmental noises becomes relatively low comparing with the likelihood of the input of recognizing target vocabulary. Therefore, non-speech is rejected by setting a predetermined threshold. However, when the real environment is different from the environment under which the recognizing target vocabulary is formed, the likelihood of the inputted recognizing target vocabulary might become low and even the recognizing target vocabulary might be rejected too.

Then, a method for rejecting the input of a non-registered vocabulary to the speech recognizing engine is used on a certain occasion, as disclosed in "Rejection of unknown speech by correcting likelihood using syllable recognition" presented in the Institute of Electronics, Information and Communication Engineers (IEICE) transactions D-II, Vol. J75-D-II, No. 12, pages 2002-2009 (hereinafter, referred to as a first literature).

According to the method disclosed in the first literature, the likelihood is calculated by comparing the input speech against the recognizing target vocabulary and also the optimal phoneme series is obtained by using all phoneme models against a previously stored recognizing-unit, thus obtaining the likelihood. The likelihood as a result of comparing the input speech against the recognizing target vocabulary largely varies between the recognizing target vocabulary (registered vocabulary) and the non-registered vocabulary and; on the other hand, the variation of likelihood in the optimal phoneme series is small. Even when the real environment is different from an environment under which the recognizing target vocabulary and the phoneme model as the previously stored recognizing-unit are formed, the influence in environment caused in the input speech appears both in the likelihood of the optimal phoneme series and in the likelihood of the recognizing target vocabulary. Therefore, a value obtained by subtracting the likelihood as the result of comparing the input speech against the recognizing target vocabulary from the likelihood of the optimal phoneme series does not vary irrespective of the difference of the environment. Rejection is accurately performed by detecting the non-registered word depending on the difference between the likelihoods.

However, while an unknown input speech has no problem, in the case of input sound which is not included in the phoneme model such as klaxon, both the likelihood of the optimal phoneme series and the likelihood of the recognizing target vocabulary are extremely low. The difference between the likelihood of the optimal phoneme series and the likelihood of the recognizing target vocabulary sometimes happens to be relatively low. In such case, the rejection is impossible by determining the threshold.

Further, another method for rejecting the input of the non-registered vocabulary to the speech recognizing engine is used, as disclosed in Japanese Unexamined Patent Application Publication No. 11-288295 (hereinafter, referred to as a second literature). In this proposal, words as the recognizing target vocabulary are previously stored and even words which are erroneously recognized as noises are stored as the recognizing target vocabulary including the environmental noise.

According to the method disclosed in the second literature, when a word having the maximum compared likelihood is included in the recognizing target vocabularies as a result of comparing the input speech against the stored recognizing target vocabulary, the recognizing result is outputted. On the contrary, when a word having the maximum compared likelihood is included in the recognizing target vocabularies containing the environmental noise, the input speech is determined as a noise and rejected.

However, the above-mentioned proposal of the second literature needs to store, as the recognizing target vocabulary including the environment noise, the words which are erroneously recognized as the noise in many cases. When the environment of the speech recognition is unspecified, the words which tend to be erroneously recognized as the noises in many cases cannot substantially be provided under any noise environment.

The above-mentioned speech recognizing apparatuses according to the first and second literatures have a problem in that the rejecting performance is not obtained for the input of only the environmental noise including no speech.

SUMMARY OF THE INVENTION

Accordingly, it is an object of the present invention to provide a speech recognizing apparatus, a speech recognizing method, and a speech recognizing program for preventing the erroneous operation with high accuracy, irrespective of the noise environment.

According to the present invention, a speech recognizing apparatus comprises: a speech section detecting unit to detect a speech section from an input signal; a characteristic amount extracting unit to analyze input speech, which is the input signal in said speech section, and extracting a time series of the amount of characteristics representing characteristics of the input speech; a recognizing target vocabulary storing unit to store predetermined recognizing target vocabularies; a recognizing target vocabulary comparing unit to compare the time series of the amount of characteristics with respective recognizing target vocabularies read from the recognizing target vocabulary storing unit one by one to obtain a likelihood that respective recognizing target vocabularies coincide with the time series of the amount of characteristics; an environment adaptive noise model storing unit to store an environment adaptive noise models adapted to an environmental noise; an environment adaptive noise model comparing unit to compare the time series of the amount of characteristics with respective environment adaptive noise models read from the environment adaptive noise model storing unit one by one to obtain a likelihood that respective environment adaptive noise models coincide with the time series of the amount of characteristics; a rejection determining unit to determine whether or not the input signal is a noise by comparing the likelihood of the registered vocabulary obtained by said recognizing target vocabulary comparing unit with the likelihood of the environmental noise obtained by said environment adaptive noise model comparing unit; and a noise model adapting unit to update the environment adaptive noise model so as to adapt to the input signal when said rejection determining unit determines that the input signal is the noise.

Further, according to the present invention, a speech recognizing apparatus comprises: a speech section detecting unit to detect a speech section from an input signal; a characteristic amount extracting unit to analyze an input speech, which is the input signal in said speech section, and extracting the time series of the amount of characteristics representing the characteristics of the input speech; a recognizing target vocabulary storing unit to store predetermined recognizing target vocabularies; a recognizing target vocabulary comparing unit to compare the time series of the amount of characteristics with respective recognizing target vocabularies read from the recognizing target vocabulary storing unit one by one to obtain a likelihood that respective recognizing target vocabularies coincide with the time series of the amount of characteristics; a recognizing-unit standard pattern storing unit to store recognizing-unit standard patterns; an environment adaptive recognizing-unit selecting unit to select at least one recognizing-unit standard patterns adaptive to an environmental noise, stored in said recognizing-unit standard pattern storing unit; an environment adaptive noise model comparing unit to compare the time series of the amount of characteristics with one recognizing-unit standard pattern or with two or more combined recognizing-unit standard patterns, selected by said environment adaptive recognizing-unit selecting unit one by one, to obtain a likelihood that said respective environment adaptive noise models coincide with the time series of characteristics; and a rejection determining unit to determine whether or not the input signal is a noise based on the likelihood obtained by said recognizing target vocabulary comparing unit and the likelihood obtained by said environment adaptive noise model comparing unit, wherein said environment adaptive recognizing-unit selecting unit selects again the recognizing-unit standard pattern stored in said recognizing-unit standard pattern storing unit so as to adapt to the input signal when said rejection determining unit determines that the input signal is the noise.

Furthermore, according to the present invention, a speech recognizing method comprises: a speech section detecting step of detecting a speech section from an input signal; a characteristic amount extracting step of analyzing an input speech, which is the input signal in said speech section, and extracting the time series of the amount of characteristics representing characteristics of the input speech; a recognizing target vocabulary comparing step of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics; an environment adaptive noise model comparing step of comparing the time series of the amount of characteristics with respective environment adaptive noise models read from the environment adaptive noise model storing unit to store predetermined environment adaptive noise models one by one to obtain a likelihood that respective environment adaptive noise models coincide with the time series of the amount of characteristics; a rejection determining step of determining whether or not the input signal is a noise by comparing the likelihood obtained by said recognizing target vocabulary comparing step with the likelihood obtained by environment adaptive noise model comparing step; and a noise model adapting step of updating the environment adaptive noise model so as to adapt to the input signal when it is determined that the input signal is the noise.

In addition, according to the present invention, a speech recognizing method comprises: a speech section detecting step of detecting a speech section from an input signal; a characteristic amount extracting step of analyzing an input speech, which is the input signal in said speech section, and extracting the time series of the amount of characteristics of the input speech; a recognizing target vocabulary comparing step of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics; an environment adaptive recognizing-unit selecting step of selecting at least one recognizing-unit standard patterns adaptive to an environmental noise from a recognizing-unit standard pattern storing unit to store recognizing-unit standard patterns; an environment adaptive noise model comparing step for comparing the time series of the amount of characteristics with one recognizing-unit standard pattern or with two or more combined recognizing-unit standard patterns, selected by said environment adaptive recognizing-unit selecting step one by one, to obtain a likelihood that said respective environment adaptive noise models coincide with the time series of characteristics; a rejection determining step of determining whether or not the input signal is a noise based on the likelihood obtained by the environment adaptive recognizing-unit selecting step and the likelihood obtained by the environment adaptive noise model comparing step; and a step of selecting again the recognizing-unit standard pattern stored in said recognizing-unit standard pattern storing unit so as to adapt to the input signal when it is determined that the input signal is the noise.

In addition, according to the present invention, a speech recognizing program product allows a computer to execute: speech section detecting processing for detecting a speech section from an input signal; characteristic amount extracting processing for analyzing an input speech, which is the input signal in said speech section, and extracting the time series of the amount of characteristics representing characteristics of the input speech; a recognizing target vocabulary comparing processing of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics; an environment adaptive noise model comparing processing of comparing the time series of the amount of characteristics with respective environment adaptive noise models read from the environment adaptive noise model storing unit to store predetermined environment adaptive noise models one by one to obtain a likelihood that respective environment adaptive noise models coincide with the time series of the amount of characteristics; rejection determining processing for determining whether or not the input signal is a noise by comparing the likelihood obtained by recognizing target vocabulary comparing processing with the likelihood obtained by environment adaptive noise model comparing processing; and noise model adapting processing for updating the environment adaptive noise model so as to adapt to the input signal when it is determined that the input signal is the noise.

In addition, according to the present invention, a speech recognizing program product allows a computer to execute: speech section detecting processing for detecting a speech section from an input signal; characteristic amount extracting processing for analyzing an input speech, which is the input signal in said speech section, and extracting the time series of the amount of characteristics representing the characteristics of the input speech; a recognizing target vocabulary comparing processing of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics; an environment adaptive recognizing-unit selecting processing of selecting at least one recognizing-unit standard patterns adaptive to an environmental noise from a recognizing-unit standard pattern storing unit to store recognizing-unit standard patterns; an environment adaptive noise model comparing processing for comparing the time series of the amount of characteristics with one recognizing-unit standard pattern or with two or more combined recognizing-unit standard patterns, selected by said environment adaptive recognizing-unit selecting step one by one, to obtain a likelihood that said respective environment adaptive noise models coincide with the time series of characteristics; rejection determining processing for determining whether or not the input signal is a noise based on the likelihood obtained by recognizing target vocabulary comparing processing and the likelihood obtained by environment adaptive noise model comparing processing; and processing for selecting again the recognizing-unit standard pattern stored in said recognizing-unit standard pattern storing unit so as to adapt to the input signal when it is determined that the input signal is the noise.

The above and other objects, features, and advantages of the invention will become more clearly understood from the following description referring to the accompanying drawings.

BRIEF DESCRIPTION OF THE DRAWINGS

FIG. 1 is a block diagram showing the structure of a speech recognizing apparatus according to a first embodiment of the present invention;

FIG. 2 is an explanatory diagram of the operation of the speech recognizing apparatus according to the first embodiment;

FIG. 3 is a block diagram showing the structure of a speech recognizing apparatus according to a second embodiment of the present invention;

FIGS. 8A and 8B are explanatory diagrams of the operation of the speech recognizing apparatus according to the third embodiment;

FIG. 9 is an explanatory diagram of statuses for selecting noise models (adaptive to the environment) upon determining the noise; and FIG. 10 is an explanatory diagram of the advantages of the speech recognizing apparatus according to the third embodiment.

DESCRIPTION OF THE PREFERRED EMBODIMENTS

Figure 4:
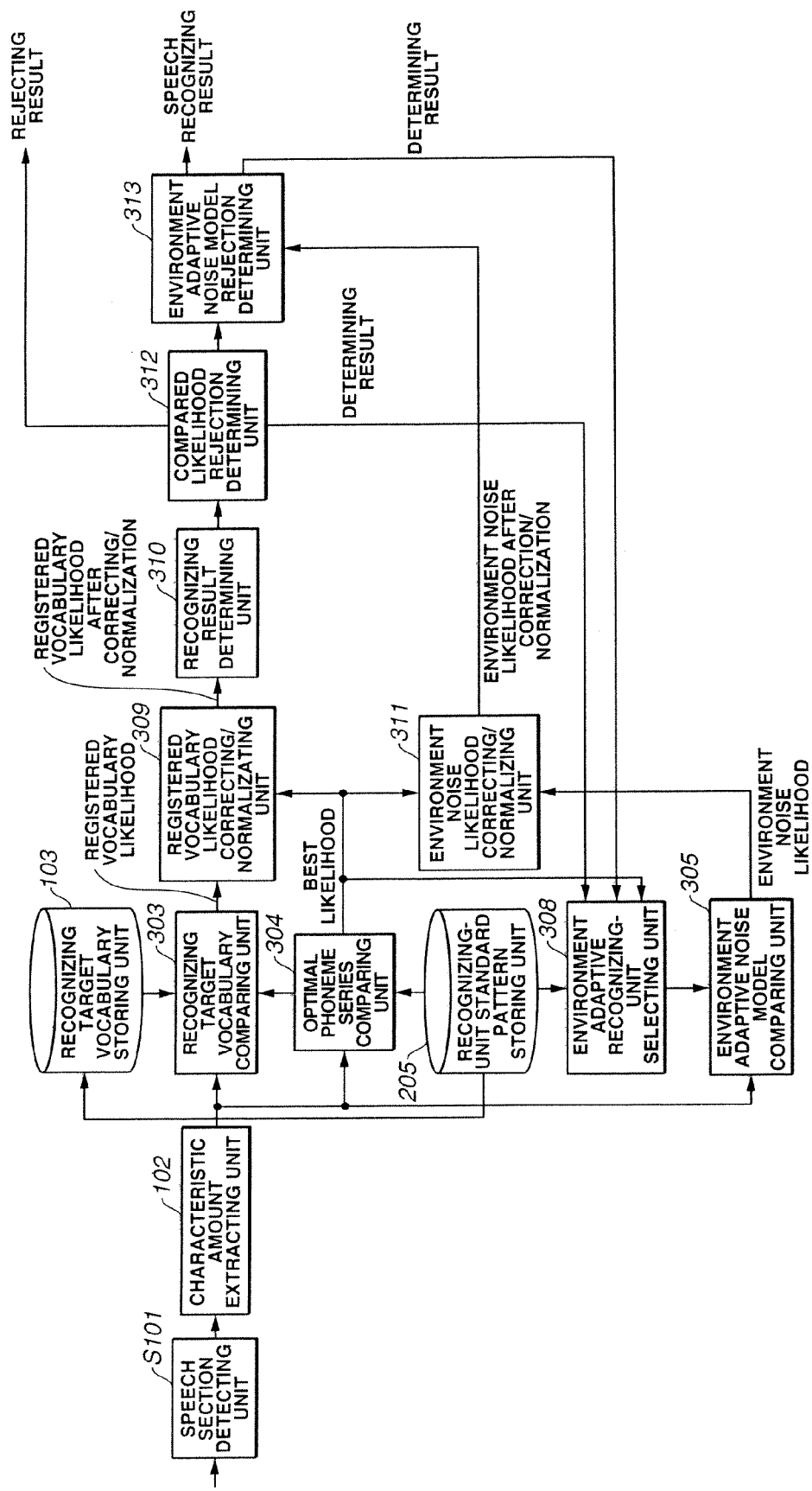
FIG. 4 is a block diagram showing the structure of a speech recognizing apparatus according to a third embodiment of the present invention.

Hereinbelow, embodiments of the present invention will be described in detail with reference to the drawings. FIG. 1 is a block diagram schematically showing the structure of a speech recognizing apparatus according to a first embodiment of the present invention.

According to the first embodiment, words as recognizing targets are stored as recognizing target vocabularies and a noise model adaptive to the environment (hereinafter, referred to as an environment adaptive noise model) is simultaneously stored. The rejecting performance considering environment noises under the entire real environment is obtained by adaptively updating the environment adaptive noise model based on the result of determining the rejection.

Referring to FIG. 1, a speech section detecting unit 101 analyzes an input signal, detects a speech section, and outputs a signal in the detected speech section to a characteristic amount extracting unit 102. The characteristic amount extracting unit 102 acoustically analyzes the input signal in the speech section, thereby extracting a time series of the amount of characteristics.

For example, the characteristic amount extracting unit 102 performs frequency analysis of the input speech with respect to a plurality of frequency bands which are predetermined to obtain a result of analyzing the frequency bands as characteristic vectors (characteristic parameters). The characteristic vectors (characteristic parameters) are obtained for every fixed-time length called a frame as a unit and the characteristic amount extracting unit 102 obtains a characteristic vector series (time series of the characteristic vectors) in the speech section. The time series of the amount of characteristics extracted by the characteristic amount extracting unit 102 is supplied to a recognizing target vocabulary comparing unit 104 and an environment adaptive noise model comparing unit 106.

Typical well-known characteristic vectors used for the speech recognition are power spectrum obtained by a band pass filter or Fourier transform, cepstrum counting obtained by LPC (Linear Predictive Coding) analysis, and the like. According to the first embodiment, any type of the user characteristic vector may be used.

A recognizing target storing unit 103 stores the recognizing target vocabulary as recognizing target words. The recognizing target vocabulary is formed based on the phoneme model. The recognizing target vocabulary comparing unit 104 reads the recognizing target vocabulary from the recognizing target vocabulary storing unit 103, compares the read recognizing target vocabulary against the time series of the amount of characteristics obtained for every recognizing target vocabulary by the characteristic amount extracting unit 102, and obtains the likelihood (hereinafter, referred to as a likelihood of the registered vocabulary). The recognizing target vocabulary comparing unit 104 outputs the obtained and registered vocabulary likelihood to a rejection determining unit 107.

As methods for calculating the compared likelihood, there are method based on DP matching or HMM (Hidden Marcov Model) described in detail in the book titled "Speech recognition using probabilistic model" written by Seiichi NAKAGAWA and published by the IEICE (The Institute of Electronics, Information and Communication Engineers) (hereinafter, referred to as a third literature).

The environment adaptive noise model storing unit 105 previously stores the noise model adaptive to the environment (environment adaptive noise model). Various environment noise models are considered. For example, a set of words (vocabularies) may be used as the environment noise model, the above-mentioned HMM according to the third literary may be used, a Gaussian distribution expressed by an average $\mu$ and a distribution $\sigma$, GMM (Generalized Moment Method) may be used, or a discrete model may be used.

An environment adaptive noise model comparing unit 106 compares the environment adaptive noise model read from the environment adaptive noise model storing unit 105 against the time series of the amount of characteristics obtained by the characteristic amount extracting unit 102 to obtain the likelihood (hereinafter, referred to as the likelihood of the environmental noise). The environment adaptive noise model comparing unit 106 outputs the obtained likelihood of the environmental noise to the rejection determining unit 107.

The rejection determining unit 107 compares the likelihood of the registered vocabulary from the recognizing target vocabulary comparing unit 104 with the likelihood of the environmental noise from the environment adaptive noise model comparing unit 106, thereby determining the rejection of the input speech. For example, the rejection determining unit 107 compares the likelihood of the registered vocabulary with the likelihood of the environmental noise. If the likelihood of the registered vocabulary is larger than the likelihood of the environmental noise, the rejection determining unit 107 outputs the selected likelihood of the recognizing target vocabulary as the result of recognizing the speech. If the likelihood of the environment noise is larger than the likelihood of the recognizing target vocabulary, the input speech is determined as the noise and is rejected.

According to the first embodiment, the rejection determining unit 107 outputs the determination result to a noise model adapting unit 108. If the input speech is determined as the noise, the noise model adapting unit 108 updates the environment adaptive noise model stored in the environment adaptive noise model storing unit 105 so as to adapt to the input.

For example, the rejection determining unit 107 matches the environment noise model stored in the environment adaptive noise model storing unit 105 to the time series of the amount of characteristics of the input speech (the time series of the characteristic vector).

Next, a description is given regarding the operation of the speech recognizing apparatus according to the first embodiment with reference to FIG. 2. FIG. 2 shows an example of the environment adaptive noise model expressed by the Gaussian distribution.

The signal in the speech section which is detected by the speech section detecting unit 101 is supplied to the characteristic amount extracting unit 102, and is analyzed by a plurality of predetermined frequency bands. Consequently, the characteristic amount extracting unit 102 converts the input speech into the series of a characteristic vector (time series of the characteristic vector), and supplies it to the recognizing target vocabulary comparing unit 104 and the environment adaptive noise model 106.

The recognizing target vocabulary comparing unit 104 compares the input speech against the time series of characteristic vector which is inputted for every recognizing target vocabulary stored in the recognizing target vocabulary storing unit 103, and calculates the likelihood of the registered vocabulary.

The environment adaptive noise model comparing unit 106 reads the environment adaptive noise model stored in the environment adaptive noise model storing unit 105, and calculates the likelihood of the environment noise between the environment adaptive noise model and the inputted time series of the characteristic vector.

The compared likelihood calculated by the recognizing target vocabulary comparing unit 104 and the environment adaptive noise model comparing unit 106 is supplied to the rejection determining unit 107. The rejection determining unit 107 compares the likelihood of the registered vocabulary with the likelihood of the environmental noise, thereby determining the rejection.

For example, in the method using the HMM according to the third literature, reference symbol Si denotes a likelihood of the registered vocabulary of a recognizing target vocabulary i, and reference symbol Sns denotes a likelihood of the environmental noise using the environment adaptive noise model. The recognizing target vocabulary is selected to obtain a maximum value max (Si) (maximum likelihood of the registered vocabulary) among the likelihoods of the registered vocabulary Si. If the likelihood of the registered vocabulary Si of the selected recognizing target vocabulary is larger than the likelihood of the environment noise Sns, it is determined that input speech is not the noise and the selected recognizing target vocabulary is outputted as a result of the recognized speech.

On the contrary, if the likelihood of the environment noise Sns is larger than the maximum likelihood of the registered vocabulary Si, the rejection determining unit 107 determines that the input speech is the noise and rejects the input speech.

According to the first embodiment, the determination result of the rejection determining unit 107 is supplied to the noise model adapting unit 108. The noise model adapting unit 108 updates the environment noise model so as to adapt to the environmental noise.

It is assumed that the environment adaptive noise model is expressed by the Gaussian distribution shown in FIG. 2 (having the average $\mu$ and the distribution $\sigma$). A thin line in FIG. 2 indicates the distribution of the environment adaptive noise model, and a thick line in FIG. 2 indicates the distribution of the input speech. To the environment adaptive noise model shown by the thin line in FIG. 2, the speech shown by the thick line is inputted and then the rejection determining unit 107 determines that the input speech is the noise. Referring to FIG. 2, in the case of the input speech having the distribution in a shadow portion, the likelihood of the environmental noise Sns has a small value. Although the input speech in this case should be rejected, the rejection determining unit 107 actually does not reject the input speech.

According to the first embodiment, however, the noise model adapting unit 108 adaptively changes the environment adaptive noise model. For example, the noise model adapting unit 108 matches the environment adaptive noise model to the input speech. That is, the noise model adapting unit 108 calculates the average and the distribution of the time series of the amount of characteristics, regarding the input speech which is determined as the noise by the rejection determining unit 107, and replaces, with the calculated values, the values of the average and the distribution of the environment adaptive noise model stored in the environment adaptive noise model storing unit 105. In other words, the distribution shown by the thin line in FIG. 2 matches to the distribution shown by the thick line.

Then, the rejection determining unit 107 subsequently rejects the input speech having the distribution in the shadow portion included in the portion shown by the thick line in FIG. 2.

As mentioned above, according to the first embodiment, the predetermined noise model is adaptively updated based on the determining result and the determination of the rejection is possible by using the noise model matching to the real environment. If it is determined that the input speech is the noise, the noise model is made adaptive to the environment, thereby rejecting the input noise with high accuracy even under unspecified environments different from the environment of the previously learned noise model. Accordingly, the erroneous operation due to the noise can be prevented with high accuracy irrespective of the noise environment.

The environment adaptive noise model and the method for adapting the environment are not limited to those according to the first embodiment.

FIG. 3 is a block diagram schematically showing the structure of a speech recognizing apparatus according to a second embodiment. Referring to FIG. 3, the same components in FIG. 1 are designated by the same reference numerals and a description thereof is omitted.

According to the first embodiment, the noise model adapting unit 108 updates the previously-stored noise model in accordance with the input noise, thereby adapting the noise model to the environmental noise. However, according to the second embodiment, the recognizing-unit standard pattern is previously stored and a pattern matching to the environmental noise is selected from the recognizing-unit standard patterns, thereby realizing the adaptation to the environment.

According to the second embodiment, unlike the first embodiment, a recognizing-unit standard pattern storing unit 205 and an environment adaptive noise model selecting unit 208 are provided, in place of the environment adaptive noise model storing unit 105 and the noise model adapting unit 108 in FIG. 1.

The recognizing-unit standard pattern storing unit 205 previously registers standard recognizing-unit patterns as a set of phoneme models. The HMM according to the third literature is used as a model which expresses the recognizing-unit standard pattern.

If the rejection determining unit 107 determines that the input speech is the noise, the environment adaptive noise model selecting unit 208 changes the selected standard pattern which is read from the recognizing-unit standard pattern storing unit 205 and supplies the changed standard pattern to the environment adaptive noise model comparing unit 106.

For example, if the rejection determining unit 107 determines that the input speech is the noise, the environment adaptive noise model selecting unit 208 calculates the likelihood by comparing the time series of the amount of characteristics obtained by the characteristic amount extracting unit 102 against the recognizing-unit standard pattern stored in the recognizing-unit standard pattern storing unit 205, orders the recognizing-unit standard patterns in accordance with the size of the likelihood, and selects only the predetermined number of high-ordered recognizing-unit standard patterns.

The environment adaptive noise model comparing unit 106 combines a plurality of the recognizing-unit standard patterns selected by the environment adaptive noise model selecting unit 208 and calculates the likelihood of the environment noise for the new input.

Next, the operation with the above-mentioned structure will be described according to the second embodiment.

Now, the rejection determining unit 107 determines that the input speech is the noise. This determination result is supplied to the environment adaptive noise model selecting unit 208. The environment adaptive noise model selecting unit 208 changes the standard pattern selected from the recognizing unit standard pattern storing unit 207.

For example, the environment adaptive noise model selecting unit 208 compares the time series of the amount of characteristics of the input speech against the recognizing-unit standard pattern stored in the recognizing-unit standard pattern storing unit 205, thereby calculating the likelihood. Further, the environment adaptive noise model selecting unit 208 orders the recognizing-unit standard patterns in accordance with the size of the likelihood, and selects only the predetermined number of high-ordered recognizing unit standard patterns. Thus, the environment adaptive noise model changes to the pattern similar to the time series of the amount of characteristics of the input speech.

Then, the environment adaptive noise model matches to the real environment. The environment adaptive noise model comparing unit 106 combines a plurality of selected recognizing-unit standard patterns, and calculates the likelihood of the environmental noise. Thus, the rejection determining unit 107 can reject the input noise with high accuracy.

According to the second embodiment, the environment adaptive noise model is formed by selecting the predetermined number of recognizing-unit standard patterns. In the case of determining the rejection, the selection of the recognizing-unit standard pattern is adaptively changed, thereby obtaining the environment adaptive noise model matching to the real environment. Thus, the erroneous operation due to the noises can be prevented with high accuracy irrespective of the noise environment.

According to the second embodiment, unlike the first embodiment, the recognizing-unit standard pattern is formed based on the phoneme model without forming a new noise model. Further, according to the second embodiment, the noise model is formed by selecting a part of the recognizing-unit standard patterns based on the phoneme model. Advantageously, the rejection can accurately be determined without preventing the likelihood of the environmental noise which is higher than the likelihood of the registered vocabulary irrespective of the input speech.

FIG. 4 is a block diagram schematically showing the structure of a speech recognizing apparatus according to a third embodiment of the present invention. Referring to FIG. 4, the same components in FIG. 3 are designated by the same reference numerals and a description thereof is omitted.

According to the third embodiment, the rejection is determined with further high accuracy by using not only the likelihood of the registered vocabulary and the likelihood of the environment noise but also the likelihood obtained by comparing against the optimal phoneme series (hereinafter, referred to as a best likelihood).

According to the third embodiment, the time series of the characteristic vector extracted from the signal in the speech section by the characteristic amount extracting unit 102 is supplied not only to a recognizing vocabulary comparing unit 303 and an environment adaptive noise model comparing unit 305 but also to a optimal phoneme series comparing unit 304.

The recognizing-unit standard pattern storing unit 205 stores the recognizing-unit standard patterns as a set of the phoneme models. The recognizing-unit standard pattern stored in the recognizing-unit standard pattern storing unit 205 typically uses the HMM (Hidden Marcov Model) which is previously learned for every biphoneme, diphoneme, or triphoneme or the like. According to the third embodiment, any type of the used recognizing unit and recognizing-unit standard pattern may be used. The recognizing target vocabulary storing unit 103 stores the recognizing target vocabulary as the recognizing target.

The optimal phoneme series comparing unit 304 combines the recognizing-unit standard patterns stored in the recognizing-unit standard pattern storing unit 205 without the limitation of the vocabulary, obtains the comparing likelihood against the time series of characteristic vector inputted from the characteristic amount extracting unit 102, and outputs a result of combining the recognizing-unit standard pattern having the maximum likelihood (optimal likelihood) and the optimal likelihood thereof. An output of the optimal phoneme series comparing unit 304 is supplied to a registered vocabulary likelihood correcting/normalizing unit 309, an environment noise likelihood correcting/normalizing unit 311, and an environment adaptive recognizing unit selecting unit 308.

The environment adaptive recognizing-unit selecting unit 308 previously selects the recognizing-unit standard pattern which frequently appears under the real noise environment, and outputs the selected recognizing-unit standard pattern to the environment adaptive noise model comparing unit 305. Further, the environment adaptive recognizing-unit selecting unit 308 adaptively selects the selected recognizing-unit standard pattern, based on the output of the optimal phoneme series comparing unit 304, the determination result of a rejection determining unit 312 using the compared likelihood, and the output by the rejection determining unit 312 using the environment adaptive noise model.

The recognizing target vocabulary comparing unit 303 combines the recognizing-unit standard patterns stored in the recognizing-unit standard pattern storing unit 205 for every recognizing target vocabulary stored in the recognizing target vocabulary storing unit 306, performs word spotting by using a halfway process of the operation for comparing the optimal phoneme series inputted from the optimal phoneme series comparing unit 304, and compares the vocabulary against the time series of characteristic vector inputted from the characteristic amount extracting unit 102, thereby obtaining the likelihood of the registered vocabulary. Further, the recognizing target vocabulary comparing unit 303 outputs the length of continuous time of the recognizing vocabulary obtained by the likelihood of the registered vocabulary and the word spotting.

Figure 5:
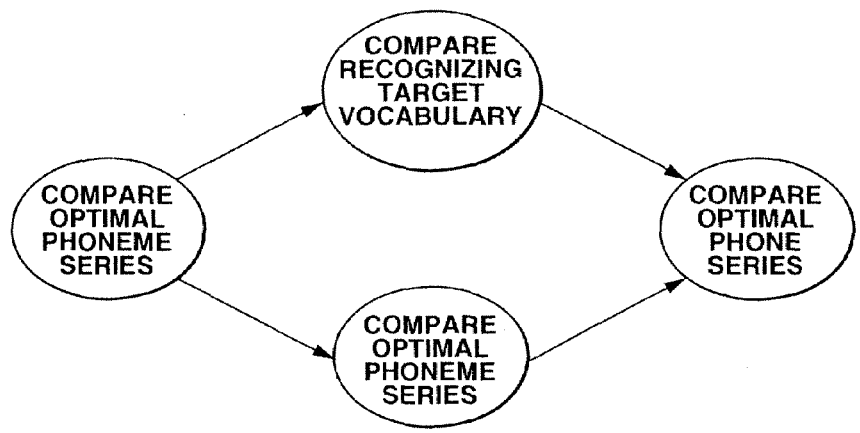
FIG. 5 is an explanatory diagram of the concept of word spotting.

FIG. 5 is an explanatory diagram showing the concept of the word spotting. In usual conversations, a meaningless phoneme string might be added to the front or back of the registered vocabulary. In the word spotting, the registered vocabulary is extracted from the input speech. Referring to FIG. 5, the registered vocabulary is extracted by comparing against the optimal phoneme series simultaneously or before/after the timing for comparing the recognizing target vocabulary. The method for the word spotting uses the method described in detail in the book titled "Speech recognition using probabilistic model", written by Seiichi NAKAGAWA, published by the IEICE (The Institute of Electronics, Information and Communication Engineers).

A registered vocabulary likelihood correcting/normalizing unit 309 corrects and normalizes the likelihood of the registered vocabulary for every recognizing target vocabulary transmitted from the recognizing target vocabulary comparing unit 303 by using the optimal likelihood from the optimal phoneme series comparing unit 304 and the length of continuous time for each of the recognizing target vocabularies from the recognizing target vocabulary comparing unit 303.

Figure 6:
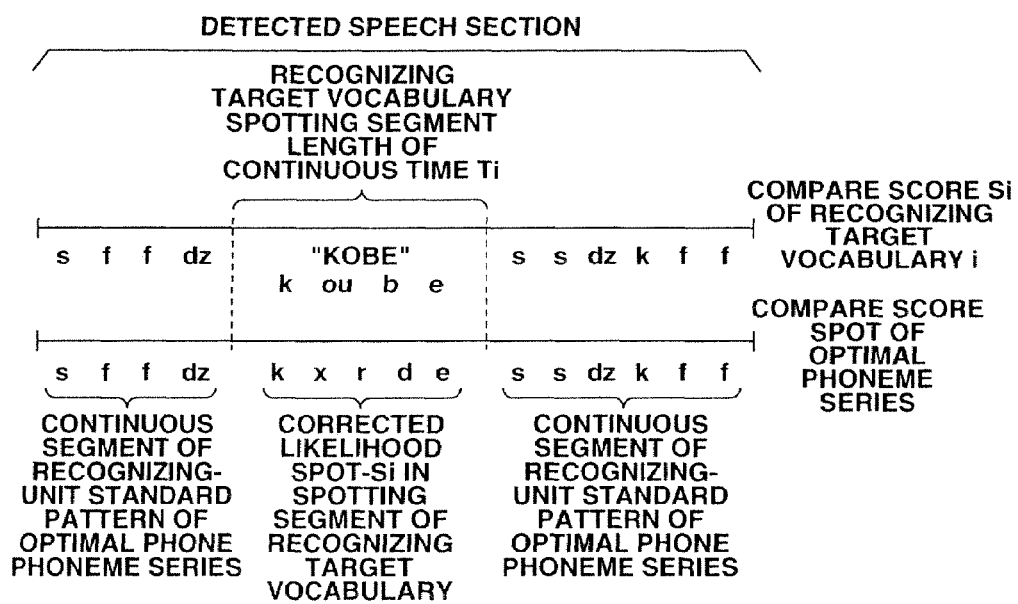
FIG. 6 is an explanatory diagram of the concept for correcting/normalizing compared likelihoods.

FIG. 6 is an explanatory diagram of the concept for correcting/normalizing the compared likelihood.

Referring to FIG. 6, as the recognizing-unit standard pattern, the phoneme expressed by a phonetic symbol is used. The recognizing target vocabulary comparing unit 303 calculates the likelihood of the registered vocabulary based on the word spotting by using the halfway comparing process provided by the optimal phoneme series comparing unit 304. Consequently, a compared score of a best portion matching to the recognizing target vocabulary is obtained from the detected speech sections by calculating the difference between the optimal likelihood Sopt and the likelihood of the registered vocabulary Si.

The normalization using the length of continuous time Ti of the spotted recognizing target vocabulary enables the calculation of the average comparing likelihood per unit time in the segment matching to the recognizing target vocabulary in the speech sections (the likelihood of the registered vocabulary after correction/normalization Pi=(Sopt−Si)/Ti).

The smaller the value Pi of the corrected/normalized likelihood is, the closer the matching result of the recognizing target vocabulary is to the matching result of the optimal phoneme series comparing unit. Thus, the speech having the smaller value Pi is closer to the recognizing vocabulary.

A recognizing result determining unit 310 compares the average compared likelihoods corrected/normalized for every recognizing target vocabulary transmitted from the registered vocabulary likelihood correcting/normalizing unit 309, and determines the recognizing target vocabulary based on the size of the likelihood. The rejection determining unit 312 using the compared likelihood compares the corrected/normalized compared likelihood of the recognizing target vocabulary determined by the recognizing result determining unit 310 with the predetermined threshold, and determines based on the comparison result whether or not the input speech is the noise. If it is determined that the input speech is a speech, the rejection determining unit 312 outputs the determined recognizing target vocabulary to the rejection determining unit 313 using the environment adaptive noise model. Further, the determining result from the rejection determining unit 312 is supplied to the environment adaptive recognizing-unit selecting unit 308. If it is determined that the input speech is a noise, the rejection determining unit 312 outputs the rejecting result.

The environment adaptive noise model comparing unit 305 combines the recognizing-unit standard patterns selected by the environment adaptive recognizing-unit selecting unit 308, performs the word spotting by using the halfway processing of comparing the optimal phoneme series inputted from the optimal phoneme series comparing unit 304, compares the spotted word with the time series of characteristic vector inputted from the characteristic amount extracting unit 102 to obtain the likelihood, and outputs the compared maximum likelihood of environment noise of the combining results of the recognizing-unit standard patterns and the length of continuous time.

The environment noise likelihood correcting/normalizing unit 311 corrects/normalizes the likelihood of the environment noise from the environment adaptive noise model comparing unit 305 by using the optimal likelihood from the optimal phoneme series comparing unit 304 and the length of continuous time of the environment adaptive noise model from the environment adaptive noise model comparing unit 305 based on the same method as that in FIG. 6. The environment noise likelihood correcting/normalizing unit 311 outputs the likelihood after correction/normalization to the rejection determining unit 313 using the environment adaptive noise model.

If the rejection determining unit 312 using the compared likelihood determines that the input speech is not the noise, the rejection determining unit 313 using the environment adaptive noise model compares the likelihood of the registered vocabulary after correction/normalization with the likelihood of the environment noise after correction/normalization, determines whether the input speech is the recognizing target vocabulary or the noise based on the comparison result, and outputs the determination result to the environment adaptive recognizing unit selecting unit 308. If it is determined that the likelihood of the registered vocabulary is smaller, the rejection determining unit 313 using the environment adaptive noise model outputs the determined recognizing target vocabulary as the result of recognizing the speech.

If the rejection determining unit 312 using the compared likelihood or the rejection determining unit 313 using the environment adaptive noise model determines that the input speech is the noise, the environment adaptive recognizing-unit selecting unit 308 receives the determining result, updates the appearance frequency of the recognizing-unit standard pattern selected by the environment adaptive recognizing-unit selecting unit 308 by using the result of combining the recognizing-unit standard patterns based on the result of comparing the optimal phoneme series, and selects again the recognizing-unit standard pattern.

Figure 7:
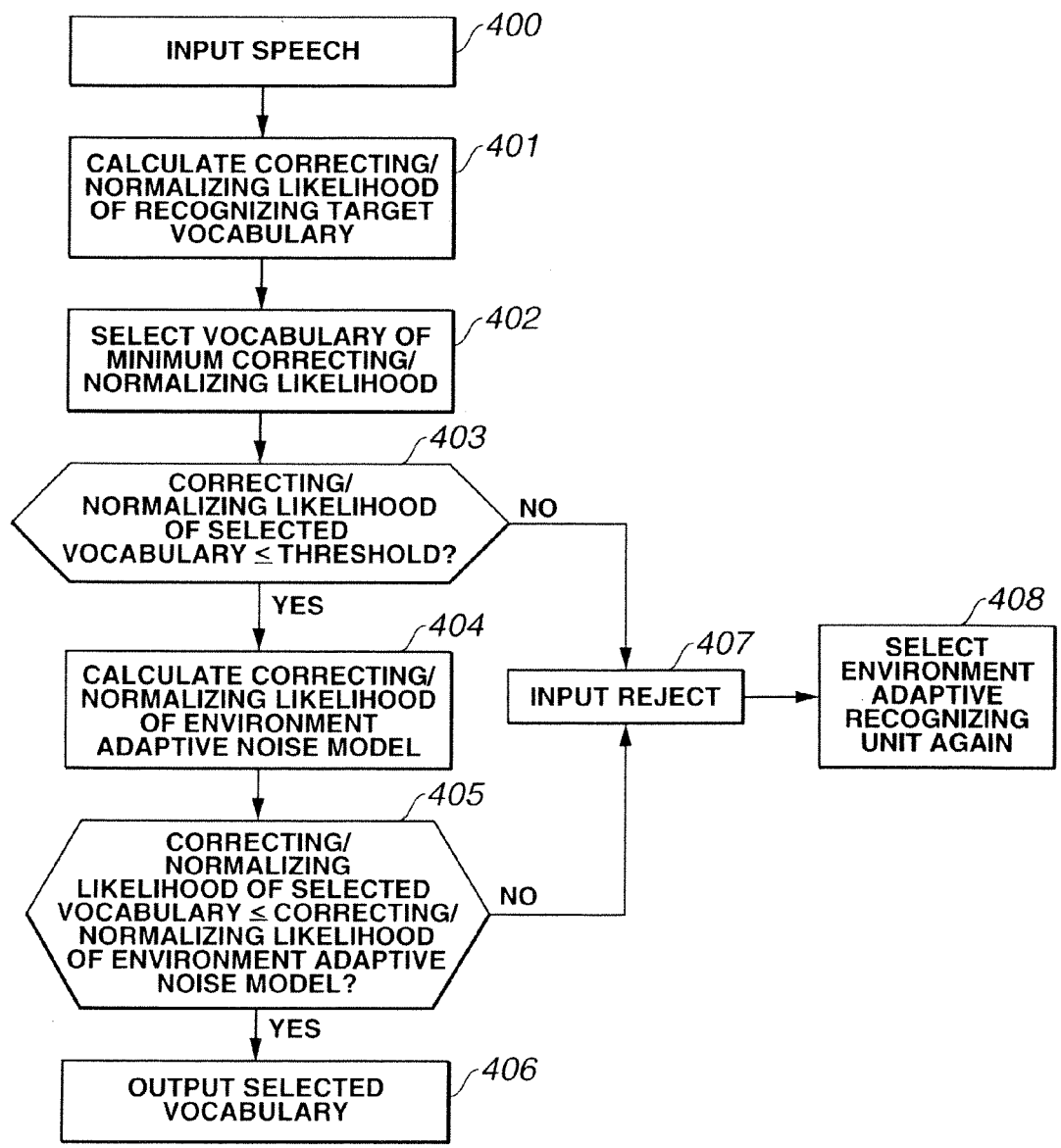
FIG. 7 is a flowchart for explaining the operation of the speech recognizing apparatus according to the third embodiment.

Next, a description is given regarding the operation with the above-mentioned structure according to the third embodiment with reference to FIGS. 7 to 10. FIG. 7 is a flowchart for explaining the operation until determining the rejection, FIGS. 8A and 8B are explanatory diagrams of the operation of the rejection determining unit using the environment adaptive noise model.

Referring to FIG. 7, in step 400, the speech is inputted. The characteristic amount extracting unit 102 converts the signal in the speech section into a series of characteristic vector (time series of the characteristic vector). The time series of the characteristic vector in the speech section is supplied to the recognizing target vocabulary comparing unit 303, the optimal phoneme series comparing unit 304, and the environment adaptive noise model comparing unit 305.

Each of the recognizing target vocabulary comparing unit 303, the optimal phoneme series comparing unit 304, and the environment adaptive noise model comparing unit 305 compares the time series of the characteristic vector with the combined recognizing-unit standard pattern which is previously stored in the recognizing-unit standard pattern storing unit 205 to calculate respective likelihood.

The optimal phoneme series comparing unit 304 combines the recognizing-unit standard patterns stored in the recognizing-unit standard pattern storing unit 205 without limitation of the vocabulary, calculates the likelihood based on the combined result and the time series of the characteristic vector from the characteristic amount extracting unit 102, and outputs the result of combining the recognizing-unit standard patterns having the maximum likelihood and the likelihood thereof (optimal likelihood). The method for calculating the likelihood uses the Viterbi algorithm when using the HMM for the recognizing-unit standard pattern.

The recognizing target vocabulary comparing unit 303 combines the recognizing-unit standard patterns stored in the recognizing-unit standard pattern storing unit 205 based on the recognizing target vocabulary stored in the recognizing target storing unit 103, performs the word spotting by using the halfway processing for comparing the optimal phoneme series inputted from the optimal phoneme series comparing unit 304, and calculates the likelihood between the combined spotted result and the time series of the characteristic vector from the characteristic amount extracting unit 102. The compared likelihood using the word spotting for every recognizing target vocabulary is supplied to the recognizing target vocabulary correcting/normalizing unit 309 together with the length of continuous time obtained by the spotting.

The environment adaptive noise model comparing unit 305 combines only the standard pattern which is previously selected with being adapted to the noise environment in the environment adaptive-unit selecting unit 308 from the recognizing-unit standard pattern stored in the recognizing-unit standard pattern storing unit 205, performs the word spotting by using the halfway processing for comparing the optimal phoneme series transmitted from the optimal phoneme series comparing unit 304, and calculates the likelihood between the combined spotted result and the time series of the characteristic vectors in the characteristic amount extracting unit 102. The likelihood as the combining result having the obtained maximum likelihood and the length of continuous time of the environment adaptive noise model obtained by the spotting are supplied to the environment noise likelihood correcting/normalizing unit 311.

In step 401, the registered vocabulary likelihood correcting/normalizing unit 309 calculates a likelihood of the registered vocabulary after correction/normalization Pi (=(Sopt−Si)/Ti) by using a likelihood of the registered vocabulary likelihood Si for each recognizing target vocabulary, a length of continuous time Ti, and a best likelihood Sopt from the optimal phoneme series comparing unit 304.

In step 402, the recognizing result determining unit 310 compares the likelihoods of the corrected/normalized recognizing target vocabularies (likelihoods of the registered vocabularies), and determines the recognizing target vocabulary having the corrected/normalized likelihood having the minimum value.

In step 403, the rejection determining unit 312 using the compared likelihood compares the likelihood of the registered vocabulary after correcting/normalizing the recognizing target vocabulary selected by the recognizing result determining unit 310 with the predetermined threshold, and determines whether or not the input speech is the noise. That is, if the likelihood after correction/normalization Pi is larger than the predetermined threshold, it is determined that the input speech is the noise and the rejection result is outputted (step 407). On the contrary, if the likelihood after correction/normalization Pi is smaller than the predetermined threshold, it is determined that the input speech is not the noise and the determining result is supplied to the rejection determining unit 313 using the environment adaptive noise model.

In step 404, similarly to the registered vocabulary likelihood correcting/normalizing unit 309, the environment noise likelihood correcting/normalizing unit 311 calculates a likelihood of the environment noise after correction/normalization, Pns=(Sopt−Sns)/Tns, by using the compared likelihood of the environment adaptive noise model (likelihood of the environment noise) Sns, the length of continuous time Tns, and the optimal likelihood Sopt transmitted from the optimal phoneme series comparing unit 304.

In step 405, with regard to the input speech which is not determined as the noise by the rejection determining unit 312 using the compared likelihood, the rejection determining unit 313 using the environment adaptive noise model compares the likelihood of the registered vocabulary after correction/normalization Pi of the recognizing target vocabulary selected by the recognizing result determining unit 310 with the likelihood of the environment noise after correction/normalization Pns. If Pi>Pns, the environment adaptive noise model is closer to the compared likelihood of the optimal phoneme series and therefore the rejection determining unit 313 determines that the input speech is the noise (step 407). On the contrary, if Pi≦Pns, the rejection determining unit 313 determines that the input speech is not the noise but the speech of the recognizing target vocabulary selected by the recognizing result determining unit 310, and outputs the recognizing target vocabulary selected in step 406 as the result of recognizing the speech.

Next, a description is given regarding the operation of the rejection determining unit 313 using the environment adaptive noise model when the recognizing target vocabulary is inputted and when the environment noise is inputted, with reference to FIGS. 8A and 8B.

FIG. 8A shows a case of inputting "KOBE (k/ou/b/e)" as the recognizing target vocabulary. The recognizing target vocabulary is inputted and then the rejection determining unit 313 using the environment adaptive noise model selects the recognizing target vocabulary "KOBE (k/ou/b/e)" with the minimum likelihood of the registered vocabulary after correction/normalization from the recognizing target vocabularies. Now, reference symbol Pw denotes the corrected/normalized likelihood. Incidentally, the recognizing-unit standard pattern uses the phoneme expressed by a phonetic symbol.

In the case of comparing using the environment adaptive noise model, the recognizing units selected adaptively to the environment are combined and a combination having the minimum likelihood of the environment noise after correction/normalization is determined. For example, selected phonemes are "u", "s", and "f", the combining result having the minimum likelihood of the environment noise after correction/normalization is "f/u/s/s/u/s", and reference symbol Pns herein denotes the corrected/normalized likelihood in this case.

If the input is "KOBE (k/ou/b/e)", the corrected/normalized likelihood Pw of the recognizing target vocabulary "KOBE (k/ou/b/e)" is smaller than the corrected/normalized likelihood Pns of the environment adaptive noise model "f/u/s/s/u/s" and therefore the recognizing result "KOBE (k/ou/b/e)" is outputted.

Referring to FIG. 8B, when the noise is inputted, similarly to the above-mentioned example, the vocabulary "KOBE (k/ou/b/e)" having the minimum likelihood of the registered vocabulary after correction/normalization is selected from the recognizing target vocabularies and then it is larger than the likelihood of the environment noise after correction/normalization of the combination of the phoneme models "f", "s", and "u" which are adaptively selected for the environment noise. The result is rejected.

Next, a description is given regarding the operation for selecting the environment adaptive noise model based on the result of determining the rejection.

If the rejection determining unit 312 using the compared likelihood or the rejection determining unit 313 using the environment adaptive noise model determines that the input speech is the noise, the result of combining the recognizing-unit standard patterns obtained by the optimal phoneme series comparing unit 304 matches to the recognizing-unit standard pattern having the maximum likelihood of the input environment noise. That is, the previously-learned recognizing-unit standard pattern is selected with acoustic characteristics which are most pseudo to those of the input noise environment from the recognizing-unit standard pattern storing unit 205.

The noise model adaptive to the noise environment under which the speech recognizing apparatus is used is formed by selecting again the recognizing-unit standard pattern in the environment recognizing-unit selecting unit 308 by using the result of the optimal phoneme series comparing unit 304.

FIG. 9 is an explanatory diagram of examples of the adaptation to the environment when it is determined that the input speech is the noise.

When it is determined that the input speech is the noise, the environment adaptive recognizing-unit selecting unit 308 updates the appearance frequency under the noise environment of the recognizing-unit standard pattern by using the statistics and the history of the recognizing-unit standard pattern used by the optimal phoneme series comparing unit 304, and uses the standard pattern having the high-ordered appearance frequency as a next noise model. As mentioned above, when it is determined that the input speech is the noise, the standard pattern matching to the noise is selected, thereby always adapting the noise model to the environmental noise.

Referring to FIG. 9, the examples using three patterns "s", "f", and "a" having the high-ordered appearance frequencies are shown as the initial recognizing-unit standard patterns. Further, as shown in FIG. 9, the appearance ratio of the result of determining the rejection is changed and a result of the noise determination 1 indicates the use of the recognizing-unit standard patterns "s", "f", and "dz". Furthermore, a result of the noise determination 2 indicates the use of the recognizing-unit standard patterns "If", "s", and "u".

The environment adaptive recognizing-unit selecting unit 308 may set the recognizing-unit standard pattern obtained from the optimal phoneme series comparing unit 304 as the next noise model without using the statistics and the history of the recognizing-unit standard pattern used by the optimal phoneme series comparing unit 304.

The third embodiment uses the rejection determination using the likelihood of the registered vocabulary after correction/normalization and the rejection determination using the likelihood of the environment noise after correction/normalization. FIG. 10 is an explanatory diagram of advantages obtained by the two rejection determinations.

Referring to FIG. 10, the ordinate shows the likelihood as the compared result and three statuses (a), (b), and (c) as the real environments indicate the likelihood using the optimal phoneme series comparing (best likelihood), the maximum likelihood of the recognizing target vocabulary (likelihood of the registered vocabulary), and the likelihood of the environment adaptive noise model (likelihood of the environment noise), respectively. As shown in FIG. 10, the length of continuous time using the word spotting of the recognizing target vocabulary is equal to the length of continuous time using the word spotting of the environment adaptive noise model for the purpose of a belief description. In this case, the rejection determination using the environment adaptive noise model may be performed by the corrected likelihood of the registered vocabulary and the corrected likelihood of the environment noise.

Referring to the status (a) in FIG. 10, when the speech is inputted, the optimal likelihood as the result of comparing the optimal phoneme series having the highest freedom to the combination of the standard pattern becomes maximum. When the input speech is included in the recognizing target vocabularies, the likelihood of the registered vocabulary of the recognizing target vocabulary might substantially be equal to the optimal likelihood. On the contrary, the environment adaptive noise model has only the standard pattern matching to the noise and therefore the likelihood of the environmental noise becomes small when the right vocabulary is inputted.

Consequently, the likelihood of the registered vocabulary after correction/normalization is smaller than the likelihood of the environmental noise after correction/normalization. The input speech is not rejected in the case of the rejection determination using the environment adaptive noise model, and the rejection determination depends on that using the likelihood of the registered vocabulary.

Next, a description is given regarding the case in which the noise is inputted and then the recognizing-unit standard pattern has a pattern obtained by acoustically modeling the environmental noise.

In this case, the recognizing-unit standard pattern has a model matching to the environmental noise. Referring to the status (b) in FIG. 10, similarly to the case in which the speech is inputted, the optimal likelihood of the result of comparing the optimal phoneme series might have a large value. On the other hand, the input of the recognizing target vocabulary is the environment noise and therefore the recognizing target vocabulary has a smaller value as compared with the case in which the recognizing target vocabulary is inputted. Consequently, the likelihood of the registered vocabulary after correction/normalization becomes large and the input speech is determined as the rejection by using the compared likelihood.

When the input speech is not determined as the rejection by using the compared likelihood, the likelihood of the environmental noise using the environment adaptive noise model might have substantially the same value as that of the optimal likelihood. Therefore, the input speech is rejected by the rejection determination using the environment adaptive noise model.

Next, a description is given regarding the case in which the noise is inputted and then the recognizing-unit standard pattern has no pattern obtained by acoustically modeling the environmental noise.

In this case, the recognizing-unit standard pattern has no model matching to the noise environment. Referring to the status (c) in FIG. 10, both the optimal likelihood and the likelihood of the registered vocabulary of the recognizing target vocabulary are small. Thus, the likelihood of the registered vocabulary after correction/normalization is also small and the rejection determination of the input speech cannot be performed by the compared likelihood.

However, when using the result of compared operation based on the environment noise adaptive model, if it is determined that the input is the noise, the standard pattern frequently appearing under the current noise environment is then selected from the recognizing-unit standard pattern. The likelihood of the environmental noise is obtained by using the selected standard pattern so that the value close to that of the optimal phoneme is obtained. In this case, it is probably determined that the input is the noise because of the rejection determination by the environment adaptive noise model.

As mentioned above, according to the third embodiment, the same advantages as those according to the first and second embodiments are obtained. Further, both the rejection determination using the environment adaptive noise model and the rejection determination using the likelihood of the registered vocabulary of the recognizing target vocabulary are simultaneously used. The rejection determination of input of the environment noise can be performed with high accuracy.

Having described the preferred embodiments of the invention referring to the accompanying drawings, it should be understood that the present invention is not limited to those precise embodiments and various changes and modifications thereof could be made by one skilled in the art without departing from the spirit of scope of the invention as defined in the appended claims.

What is claimed is:

1. A computer-readable medium storing a speech recognizing computer program, the computer program determining a computer to execute:

speech section detecting processing for detecting a speech section from an input signal;

characteristic amount extracting processing for analyzing an input speech, which is the input signal in the speech section, and extracting the time series of the amount of characteristics representing characteristics of the input speech;

a recognizing target vocabulary comparing processing of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;

an environment adaptive noise model comparing processing of comparing the time series of the amount of characteristics with one recognizing standard pattern or with two or more combined recognizing standard patterns one by one to obtain a likelihood that respective environment adaptive noise models coincide with the time series of the amount of characteristics;

rejection determining processing for determining whether or not the input signal is a noise by comparing the likelihood obtained by recognizing target vocabulary comparing processing with the likelihood obtained by environment adaptive noise model comparing processing; and noise model adapting processing for, when it is determined that the input signal is the noise, ordering the recognizing standard patterns and selecting a predetermined number of higher-ordered recognizing standard patterns.

2. The computer-readable medium storing a speech recognizing computer program according to claim 1, wherein the environment adaptive noise model comparing processing combines the patterns selected in the noise model adapting processing and determines a likelihood of environment noise for another speech input.

3. The computer-readable medium storing a speech recognizing computer program according to claim 1, wherein the noise model adapting processing calculates a first likelihood by comparing the time series of the amount of characteristics with recognizing standard patterns and orders the recognizing standard patterns in accordance with a size of the first likelihood.

4. A computer-readable medium storing a speech recognizing computer program, the computer program determining a computer to execute:

speech section detecting processing for detecting a speech section from an input signal; characteristic amount extracting processing for analyzing an input speech, which is the input signal in the speech section, and extracting the time series of the amount of characteristics representing the characteristics of the input speech;

a recognizing target vocabulary comparing processing of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;

an environment adaptive recognizing-unit selecting processing of selecting at least one recognizing-unit standard patterns adaptive to an environmental noise from a recognizing-unit standard pattern storing unit to store recognizing-unit standard patterns;

an environment adaptive noise model comparing processing for comparing the time series of the amount of characteristics with one recognizing-unit standard pattern or with two or more combined recognizing-unit standard patterns, selected by the environment adaptive recognizing-unit selecting step one by one, to obtain a likelihood that the respective environment adaptive noise models coincide with the time series of characteristics;

rejection determining processing for determining whether or not the input signal is a noise based on the likelihood obtained by recognizing target vocabulary comparing processing and the likelihood obtained by environment adaptive noise model comparing processing; and processing for selecting again the recognizing-unit standard pattern stored in the recognizing-unit standard pattern storing unit so as to adapt to the input signal when it is determined that the input signal is the noise by ordering the recognizing-unit standard patterns and selecting a predetermined number of higher-ordered recognizing-unit standard patterns, wherein the recognizing-unit standard pattern is a phoneme model.

5. The computer-readable medium storing a speech recognizing computer program according to claim 4, wherein the environment adaptive noise model comparing processing combines the patterns selected in the processing for selecting again and determines a likelihood of environment noise for another speech input.

6. The computer-readable medium storing a speech recognizing computer program according to claim 2, wherein the processing for selecting again calculates a first likelihood by comparing the time series of the amount of characteristics with recognizing standard patterns and orders the recognizing standard patterns in accordance with a size of the first likelihood.

7. A computer-readable medium storing a speech recognizing computer program, the computer program determining a computer to execute: speech section detecting processing for detecting a speech section from an input signal;

characteristic amount extracting processing for analyzing an input speech, which is the input signal in the speech section, and extracting the time series of the amount of characteristics representing the characteristics of the input speech;

a recognizing target vocabulary comparing processing of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;

an environment adaptive recognizing-unit selecting processing of selecting at least one recognizing-unit standard patterns adaptive to an environmental noise from a recognizing-unit standard pattern storing unit to store recognizing-unit standard patterns;

an environment adaptive noise model comparing processing for comparing the time series of the amount of characteristics with one recognizing-unit standard pattern or with two or more combined recognizing-unit standard patterns, selected by the environment adaptive recognizing-unit selecting step one by one, to obtain a likelihood that the respective environment adaptive noise models coincide with the time series of characteristics;

rejection determining processing for determining whether or not the input signal is a noise based on the likelihood obtained by recognizing target vocabulary comparing processing and the likelihood obtained by environment adaptive noise model comparing processing; and processing for selecting again the recognizing-unit standard pattern stored in the recognizing-unit standard pattern storing unit so as to adapt to the input signal when it is determined that the input signal is the noise including ordering the recognizing-unit standard patterns and selecting a predetermined number of higher-ordered recognizing-unit standard patterns, wherein the rejection determining processing determines whether or not the input signal is the noise by comparing the likelihood obtained by the recognizing target vocabulary comparing processing with the likelihood obtained by the environment adaptive noise model comparing processing.

8. The computer-readable medium storing a speech recognizing computer program according to claim 7, wherein the environment adaptive noise model comparing processing combines the patterns selected in the processing for selecting again and determines a likelihood of environment noise for another speech input.

9. The computer-readable medium storing a speech recognizing computer program according to claim 7, wherein the processing for selecting again calculates a first likelihood by comparing the time series of the amount of characteristics with recognizing standard patterns and orders the recognizing standard patterns in accordance with a size of the first likelihood.

10. A computer-readable medium storing a speech recognizing computer program, the computer program determining a computer to execute:

speech section detecting processing for detecting a speech section from an input signal; characteristic amount extracting processing for analyzing an input speech, which is the input signal in the speech section, and extracting the time series of the amount of characteristics representing the characteristics of the input speech;

a recognizing target vocabulary comparing processing of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;

an environment adaptive recognizing-unit selecting processing of selecting at least one recognizing-unit standard patterns adaptive to an environmental noise from a recognizing-unit standard pattern storing unit to store recognizing-unit standard patterns;

an environment adaptive noise model comparing processing for comparing the time series of the amount of characteristics with one recognizing-unit standard pattern or with two or more combined recognizing-unit standard patterns, selected by the environment adaptive recognizing-unit selecting step one by one, to obtain a likelihood that the respective environment adaptive noise models coincide with the time series of characteristics;

rejection determining processing for determining whether or not the input signal is a noise based on the likelihood obtained by recognizing target vocabulary comparing processing and the likelihood obtained by environment adaptive noise model comparing processing; and processing for selecting again the recognizing-unit standard pattern stored in the recognizing-unit standard pattern storing unit so as to adapt to the input signal when it is determined that the input signal is the noise including ordering the recognizing-unit standard patterns and selecting a predetermined number of higher-ordered recognizing-unit standard patterns, wherein the rejection determining processing comprises:
a first determining processing to determine the rejection by using the likelihood obtained by the recognizing target vocabulary comparing processing; and
a second determining processing to determine the rejection by using the likelihood obtained by the environment adaptive noise model comparing processing.

11. The computer-readable medium storing a speech recognizing computer program according to claim 10, wherein the first determining processing determines a rejection by comparing the likelihood obtained by the recognizing target vocabulary comparing processing with a predetermined threshold, and the second determining processing determines a rejection of the input signal which is determined as the speech by the first determining processing by using the likelihood obtained by the environment adaptive noise model comparing processing.

12. The computer-readable medium storing a speech recognizing computer program according to claim 10, wherein the environment adaptive noise model comparing processing combines the patterns selected in the processing for selecting again and determines a likelihood of environment noise for another speech input.

13. The computer-readable medium storing a speech recognizing computer program according to claim 10, wherein the processing for selecting again calculates a first likelihood by comparing the time series of the amount of characteristics with recognizing standard patterns and orders the recognizing standard patterns in accordance with a size of the first likelihood.

14. A speech recognizing method comprising:
a speech section detecting step of detecting a speech section from an input signal;
a characteristic amount extracting step of analyzing an input speech, which is the input signal in the speech section, and extracting the time series of the amount of characteristics representing characteristics of the input speech;
a recognizing target vocabulary comparing step of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;
an environment adaptive noise model comparing step of comparing the time series of the amount of characteristics with recognizing standard pattern or with two or more combined recognizing standard patterns one by one to obtain a likelihood that respective environment adaptive noise models coincide with the time series of the amount of characteristics;
a rejection determining step of determining whether or not the input signal is a noise by comparing the likelihood obtained by the recognizing target vocabulary comparing step with the likelihood obtained by environment adaptive noise model comparing step; and
a noise model adapting processing step, when it is determined that the input signal is the noise, of ordering the recognizing standard patterns and selecting a predetermined number of higher-ordered recognizing standard patterns.

15. The speech recognizing method according to claim 14, wherein the environment adaptive noise model comparing step combines the patterns selected in the noise model adapting processing and determines a likelihood of environment noise for another speech input.

16. The speech recognizing method according to claim 14, wherein the noise model adapting step calculates a first likelihood by comparing the time series of the amount of characteristics with recognizing standard patterns and orders the recognizing standard patterns in accordance with a size of the first likelihood.

17. A speech recognizing method comprising:
a speech section detecting step of detecting a speech section from an input signal;
a characteristic amount extracting step of analyzing an input speech, which is the input signal in the speech section, and extracting the time series of the amount of characteristics of the input speech;
a recognizing target vocabulary comparing step of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;
an environment adaptive recognizing-unit selecting step of selecting at least one recognizing-unit standard patterns adaptive to an environmental noise from a recognizing-unit standard pattern storing unit to store recognizing-unit standard patterns;
an environment adaptive noise model comparing step for comparing the time series of the amount of characteristics with one recognizing-unit standard pattern or with two or more combined recognizing-unit standard patterns, selected by the environment adaptive recognizing-unit selecting step one by one, to obtain a likelihood that the respective environment adaptive noise models coincide with the time series of characteristics;
a rejection determining step of determining whether or not the input signal is a noise based on the likelihood obtained by the environment adaptive recognizing-unit selecting step and the likelihood obtained by the environment adaptive noise model comparing step; and
a step of selecting again the recognizing-unit standard pattern stored in the recognizing-unit standard pattern storing unit so as to adapt to the input signal when it is determined that the input signal is the noise including ordering the recognizing-unit standard patterns and selecting a predetermined number of higher-ordered recognizing-unit standard patterns, wherein the recognizing-unit standard pattern is a phoneme model.

18. The speech recognizing method according to claim 17, wherein the environment adaptive noise model comparing step combines the patterns selected in the step of selecting again and determines a likelihood of environment noise for another speech input.

19. The speech recognizing method according to claim 17, wherein the step of selecting again calculates a first likelihood by comparing the time series of the amount of characteristics with recognizing standard patterns and orders the recognizing standard patterns in accordance with a size of the first likelihood.

20. A speech recognizing method comprising:
a speech section detecting step of detecting a speech section from an input signal;
a characteristic amount extracting step of analyzing an input speech, which is the input signal in the speech section, and extracting the time series of the amount of characteristics of the input speech;
a recognizing target vocabulary comparing step of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;
an environment adaptive recognizing-unit selecting step of selecting at least one recognizing-unit standard patterns adaptive to an environmental noise from a recognizing-unit standard pattern storing unit to store recognizing-unit standard patterns;
an environment adaptive noise model comparing step for comparing the time series of the amount of characteristics with one recognizing-unit standard pattern or with two or more combined recognizing-unit standard patterns, selected by the environment adaptive recognizing-unit selecting step one by one, to obtain a likelihood that the respective environment adaptive noise models coincide with the time series of characteristics;
a rejection determining step of determining whether or not the input signal is a noise based on the likelihood obtained by the environment adaptive recognizing-unit selecting step and the likelihood obtained by the environment adaptive noise model comparing step; and
a step of selecting again the recognizing-unit standard pattern stored in the recognizing-unit standard pattern storing unit so as to adapt to the input signal when it is determined that the input signal is the noise including ordering the recognizing-unit standard patterns and selecting a predetermined number of higher-ordered recognizing-unit standard patterns,
wherein the rejection determining step determines whether or not the input signal is the noise by comparing the likelihood obtained by the recognizing target vocabulary comparing step with the likelihood obtained by the environment adaptive noise model companng step.

21. The speech recognizing method according to claim 20, wherein the environment adaptive noise model comparing step combines the patterns selected in the step of selecting again and determines a likelihood of environment noise for another speech input.

22. The speech recognizing method according to claim 20, wherein the step of selecting again calculates a first likelihood by comparing the time series of the amount of characteristics with recognizing standard patterns and orders the recognizing standard patterns in accordance with a size of the first likelihood.

23. A speech recognizing method comprising:
a speech section detecting step of detecting a speech section from an input signal;
a characteristic amount extracting step of analyzing an input speech, which is the input signal in the speech section, and extracting the time series of the amount of characteristics of the input speech;
a recognizing target vocabulary comparing step of comparing the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;
an environment adaptive recognizing-unit selecting step of selecting at least one recognizing-unit standard patterns adaptive to an environmental noise from a recognizing-unit standard pattern storing unit to store recognizing-unit standard patterns;
an environment adaptive noise model comparing step for comparing the time series of the amount of characteristics with one recognizing-unit standard pattern or with two or more combined recognizing-unit standard patterns, selected by the environment adaptive recognizing-unit selecting step one by one, to obtain a likelihood that the respective environment adaptive noise models coincide with the time series of characteristics;
a rejection determining step of determining whether or not the input signal is a noise based on the likelihood obtained by the environment adaptive recognizing-unit selecting step and the likelihood obtained by the environment adaptive noise model comparing step; and
a step of selecting again the recognizing-unit standard pattern stored in the recognizing-unit standard pattern storing unit so as to adapt to the input signal when it is determined that the input signal is the noise including ordering the recognizing-unit standard patterns and selecting a predetermined number of higher-ordered recognizing-unit standard patterns,
wherein the rejection determining step comprises:
a first determining step for determining the rejection by using the likelihood obtained by the recognizing target vocabulary comparing step; and
a second determining step for determining the rejection by using the likelihood obtained by the environment adaptive noise model comparing step.

24. The speech recognizing method according to claim 23, wherein the first determining step determines a rejection by comparing the likelihood obtained by the recognizing target vocabulary comparing step with a predetermined threshold, and the second determining step determines a rejection of the input signal which is determined as the speech by the first determining step by using the likelihood obtained by the environment adaptive noise model comparing step.

25. The speech recognizing method according to claim 23, wherein the environment adaptive noise model comparing step combines the patterns selected in the processing for selecting again step and determines a likelihood of environment noise for another speech input.

26. The speech recognizing method according to claim 23, wherein the step of selecting again calculates a first likelihood by comparing the time series of the amount of characteristics with recognizing standard patterns and orders the recognizing standard patterns in accordance with a size of the first likelihood.

27. A speech recognizing apparatus, comprising:

a speech section detecting unit to detect a speech section from an input signal;

characteristic amount extracting unit top analyzing an input speech, which is the input signal in the speech section, and extract the time series of the amount of characteristics representing characteristics of the input speech;

a recognizing target vocabulary comparing unit to compare the time series of the amount of characteristics with respective recognizing target vocabularies read from a recognizing target vocabulary storing unit to store predetermined recognizing target vocabularies one by one to obtain a likelihood that respective recognizing target vocabularies coincide with the time series of the amount of characteristics;

an environment adaptive noise model comparing unit to compare the time series of the amount of characteristics with one recognizing standard pattern or with two or more combined recognizing standard patterns one by one to obtain a likelihood that respective environment adaptive noise models coincide with the time series of the amount of characteristics;

rejection determining unit to determine whether or not the input signal is a noise by comparing the likelihood obtained by recognizing target vocabulary comparing processing with the likelihood obtained by environment adaptive noise model comparing processing; and noise model adapting unit to, when it is determined that the input signal is the noise, order the recognizing standard patterns and selecting a predetermined number of higher-ordered recognizing standard patterns.

* * * * *